(12) United States Patent
Fobbe

(10) Patent No.: US 9,797,591 B2
(45) Date of Patent: Oct. 24, 2017

(54) LED PANEL LIGHT

(71) Applicant: Bega Gantenbrink-Leuchten KG, Menden (DE)

(72) Inventor: Klaus Fobbe, Menden (DE)

(73) Assignee: BEGA GANTENBRINK-LEUCHTEN KG, Menden (DE)

( * ) Notice: Subject to any disclaimer, the term of this patent is extended or adjusted under 35 U.S.C. 154(b) by 23 days.

(21) Appl. No.: 14/513,014

(22) Filed: Oct. 13, 2014

(65) Prior Publication Data

US 2015/0103558 A1   Apr. 16, 2015

(30) Foreign Application Priority Data

Oct. 16, 2013   (EP) .................................. 13004955

(51) Int. Cl.
| | |
|---|---|
| *F21V 15/01* | (2006.01) |
| *F21V 8/00* | (2006.01) |
| *F21V 31/00* | (2006.01) |
| *F21V 17/12* | (2006.01) |
| *F21Y 115/10* | (2016.01) |

(52) U.S. Cl.
CPC ............ *F21V 31/005* (2013.01); *F21V 15/01* (2013.01); *F21V 17/12* (2013.01); *G02B 6/0055* (2013.01); *G02B 6/0073* (2013.01); *G02B 6/0081* (2013.01); *G02B 6/0093* (2013.01); *F21Y 2115/10* (2016.08)

(58) Field of Classification Search
CPC ....... F21V 31/005; F21V 15/01; G02B 6/009; G02B 6/0091; G02B 6/0088; G02B 6/0086; G02B 6/0093; G02B 6/0073; G02B 6/0055; G02F 1/133308
See application file for complete search history.

(56) References Cited

U.S. PATENT DOCUMENTS

| | | | |
|---|---|---|---|
| 2005/0243573 A1* | 11/2005 | Kim ..................... | G02B 6/0086 362/600 |
| 2006/0256583 A1* | 11/2006 | Shimizu et al. .............. | 362/633 |
| 2010/0254121 A1 | 10/2010 | Zhou | |
| 2010/0265738 A1* | 10/2010 | Lin ..................... | G02B 6/0031 362/609 |

(Continued)

FOREIGN PATENT DOCUMENTS

| | | |
|---|---|---|
| DE | 10315251 B4 | 7/2009 |
| WO | 03083529 A1 | 10/2003 |

*Primary Examiner* — Karabi Guharay
(74) *Attorney, Agent, or Firm* — Baker & Hostetler LLP

(57) ABSTRACT

A LED panel light comprises an optical layer structure, including a top side, a bottom side and an edge and at least two substantially plate-shaped layers arranged on top of one another, and further comprises LEDs as light source, the LEDs being arranged at the edge of the layer structure and radiating light into the layer structure at the side, and further comprises a housing frame and at least one seal. The seal encloses the LEDs and the edge of the layer structure, the seal being in contact with the top side and the bottom side of the layer structure and resting against or on the housing frame so the seal seals the layer structure against the housing frame, the housing frame and the layer structure being clamped relative to one another such that the seal is pressed against the top side and the bottom side of the layer structure.

18 Claims, 2 Drawing Sheets

(56) References Cited

U.S. PATENT DOCUMENTS

| | | | |
|---|---|---|---|
| 2011/0069255 A1* | 3/2011 | Choi | G02B 6/0088 349/63 |
| 2011/0237833 A1 | 9/2011 | Koltermann et al. | |
| 2011/0267833 A1* | 11/2011 | Verrat-Debailleul | B32B 17/10036 362/545 |
| 2012/0026424 A1* | 2/2012 | Youk et al. | 349/62 |
| 2013/0027916 A1 | 1/2013 | Caferro et al. | |

\* cited by examiner

LED PANEL LIGHT

CROSS-REFERENCE TO RELATED APPLICATION

This application claims priority to foreign European patent application No. EP 13004955.4, filed on Oct. 16, 2013, the disclosure of which is incorporated by reference in its entirety.

FIELD OF THE INVENTION

The present invention relates to an LED panel light. A generic LED panel light comprises an optical layer structure, the layer structure including a top side, a bottom side and an edge and consisting of at least two substantially plate-shaped layers arranged on top of one another. A generic LED panel light further comprises several LEDs as light source, the LEDs being arranged at the edge of the layer structure and radiating light into the layer structure at the side. The generic LED panel light further comprises a housing frame and at least one seal, the seal sealing the optical layer structure against the housing frame.

BACKGROUND

LED panel lights of the above-mentioned type are known from the prior art, for which additional measures have to be taken in order to protect the layers of the layer structure and the LEDs from dust or humidity. Usually, the layer structure consists of a reflector layer, a cover glass, and a light guiding layer interposed there between which distributes the light of the LEDs, arranged on the edge of the layer structure, uniformly over the total surface. The layers of the layer structure can, for instance, be glued to one another. It is also possible to glue the LEDs to the layer structure. It is also known to use additional seals for sealing the layer structure. Also, LED panel lights of the above-mentioned type are known whose layer structure is not additionally sealed. In the course of time, these lights are subject to a deposition of dirt and/or condensed water between the individual layers so that the light output and the efficiency of the light are reduced.

An LED panel light is known from DE 103 15 251 B4. This light uses a sealing frame which fully surrounds an optical layer structure along the narrow sides thereof. The structure is formed of a base part, a light guide and a transparent cover. To seal the structure, the sealing frame is formed, in one embodiment, of a hot glue plastic material which permanently glues the base part and the cover together.

It is a drawback of the light known from DE 103 15 251 B4 that the use of a hot glue plastic material prevents an exchange of defect component parts, e.g. the LEDs. A housing frame into which the structure is inserted, and which is sealed by a second seal, is not described.

An illumination device for glazings in vehicles is known from US 2011/0267833 A1. In this device light-emitting diodes are used to illuminate an automotive glazing at the side. The optical layer structure is here formed of one or several transparent sheets which are glued together so as to avoid splintering. LEDs are mounted as illuminants at the side and are embraced by a seal. The seal is formed of a U-shaped metal section which is covered by rubber. Additionally, the region inside the seal, in which the LED is arranged, is filled with a transparent adhesive for sealing purposes.

SUMMARY OF THE INVENTION

It is the object of the present invention to provide an LED panel light of the above-mentioned type in which the exposure of the optical components to dirt and the loss of efficiency associated therewith are effectively and easily prevented. In addition, the production of the LED panel light is to be rendered more cost-effective and easier.

The object is achieved by the features of claim 1. Accordingly, in connection with an LED panel light of the above-mentioned type, the object is solved in accordance with the invention if the seal encloses the LEDs and the edge of the layer structure, the seal being in contact with the top side and the bottom side of the layer structure and resting against or on the housing frame so that the seal seals the layer structure against the housing frame, the housing frame and the layer structure being clamped relative to one another such that the seal is pressed against the top side and the bottom side of the layer structure.

In other words, the seal is arranged between the layer structure and the housing frame, on the one hand, and encloses the edge of the layer structure, on the other hand, such that the LEDs arranged at the edge, too, are enclosed between the edge and the seal. Thus, only one single seal is necessary to seal the layers of the layer structure with respect to one another and the layer structure against the housing frame, namely by pressing the outside of the seal against the housing frame and, at the same time, the seal against the top side and the bottom side of the layer structure.

The light source of the light according to the invention is formed of several LEDs, whereby identical or different LEDs may be used. In particular, so-called LED strips are suited, where several LEDs are arranged on a flexible circuit board. The LEDs are preferably arranged on two opposite sides at the edge of the layer structure. It is also possible, however, that LEDs are arranged at only one side, at three or all four sides at the edge of the layer structure. For instance, the LEDs may also be arranged at the edge of the layer structure of a round LED panel light. Moreover, the LEDs may include a primary optic.

In accordance with the invention a housing frame is both a one-piece housing frame and a housing frame comprising several parts. In accordance with the invention the housing frame may surround the layer structure in whole or in part. The housing frame preferably comprises a fixing device for mounting the LED panel light, for instance, on a ceiling. The housing frame may also be, for instance, the fixing frame of a suspended ceiling.

Other components of the light, such as drivers or transformers, may be fixed to the housing frame, or in particular also to the top side of the layer structure.

The assembly of the light comprises the following steps:
arranging the individual layers of the optical layer structure on top of one another;
arranging the LEDs at the edge of the layer structure;
attaching the seal so as to surround the LEDs and the edge of the layer structure and rest against the top side and the bottom side of the layer structure;
arranging the seal, together with the LEDs and the layer structure, on the housing frame so that the housing frame rests against or on the seal;
clamping the layer structure relative to the housing frame so that the seal seals the layer structure against the housing frame and the seal is pressed against the top side and the bottom side of the layer structure.

The invention has the advantages that the use of one single seal allows a compact construction, and the number of the component parts for the assembly as well as the production costs are reduced.

Advantageous embodiments of the present invention are defined in the dependent claims.

In a preferred embodiment the layers of the layer structure are arranged loosely on top of one another, in particular are not glued to one another or connected to one another using an alternative form of material bond. Due to the use of the enclosing seal according to the invention it is not necessary to glue the individual layers together in order to protect the structure against dirt. This facilitates the production process, and the individual layers can be exchanged in the event of damage. Moreover, the layer structure is adaptable to different lighting technology related tasks. Tensions ensuing from different heat conduction coefficients with permanently connected layers will not occur.

In another preferred embodiment the layer structure comprises a reflector plate, a light guiding layer and a cover glass. The light is radiated into the light guiding layer at the side and distributed over the total surface of the light guiding layer. The reflector layer limits the layer structure on the top side, the cover glass limits the layer structure on the bottom side in the light radiation direction. The light output of the light is increased if the light impinging on the reflector plate is reflected back in the light radiation direction. The cover glass diffusely scatters the light for emitting it as uniformly as possible over the total surface.

The individual layers of the layer structure are preferably configured as continuous plates so as to provide the structure with stability. Alternatively, they may also consist of several segments. In particular, the two outer layers, e.g. the reflector plate and the cover glass, are preferably formed to be continuous.

The outer surface of the cover glass limiting the layer structure is preferably plane, but may alternatively also be arched or have other geometrical shapes in order to fulfill different lighting technology related tasks, or adapt itself to the design of the housing of the light.

The outer surface of the reflector plate limiting the layer structure preferably comprises fixing devices for additional components of the LED panel light. This results in a modular construction as the layer structure, together with all necessary components, can be inserted in differently configured housing frames.

Preferably, the cover glass is made of polymethyl methacrylate (PMMA), glass or polycarbonate (PC), and is opal or provided with a white coating. The light guiding layer is preferably formed as a prism plate coupling out light, and is made of PMMA.

In another preferred embodiment the LED panel light comprises a profile strip which is arranged at the edge of the layer structure and on which the LEDs are arranged. This permits a simple and precise positioning of several LEDs, in particular an LED strip at the edge of the layer structure, and provides for additional protection against damage.

Preferably, the profile strip is made of a material which has a high thermal conductivity, such as aluminum, so as to allow an effective dissipation of the heat generated during the operation of the LEDs.

In another particularly preferred embodiment the profile strip is permanently connected to at least one layer of the layer structure. This permits an easier production and a precise determination of the distance between the LED and the layer structure. Alternatively, it is also possible that the profile strip and the layer are configured integrally.

In another particularly preferred embodiment the profile strip is screwed to at least one layer of the layer structure, or secured by retaining clips. The use of retaining clips or screws allows a cost-effective and easy production of the light, and the profile strip can be separated from the layer structure, if necessary, for the exchange of components.

In another particularly preferred embodiment the profile strip is screwed to the reflector plate. Regardless of the configuration of the rest of the layer structure the reflector plate will preferably always have a continuous configuration and is, therefore, suited for fixing the profile strip, regardless of the construction of the rest of the layer structure. Moreover, by fixing it to the reflector plate, it is possible to avoid undesired shades on the cover glass which may occur, for instance, upon fixing it to the cover glass or the light guiding layer.

In another preferred embodiment an angled leg is formed on the profile strip. The profile strip is fixed to the layer structure by means of this leg, and a precise determination of the distance of the LED to the layer structure is possible. In particular, the profile strip may be L-shaped or U-shaped.

In another preferred embodiment at least one first interlocking member is formed on the profile strip and at least one second interlocking member is formed on the seal. If the profile strip is inserted into the seal the first interlocking member and the second interlocking member interact to allow a precise positioning of the profile strip and prevent a displacement thereof.

In another preferred embodiment the seal is configured as an one-piece, circumferential seal which encloses the entire edge of the layer structure. This results in a particularly effective sealing effect, and the assembly is facilitated by a reduction of the components. The openings in the seal possibly required for the cable routing are not in conflict with the circumferential seal entirely enclosing the edge of the layer structure.

In another embodiment the cross-section of the seal is substantially U-shaped. The plane and large contact surfaces result in a particularly effective sealing effect and a simple assembly. The force required for clamping the individual components relative to one another is distributed particularly uniformly if the contact surface is plane.

Alternatively, other geometrical shapes of the seal are conceivable as well, however, e.g. to adapt the shape of the seal to the contact surface of the housing frame.

In another preferred embodiment the seal is made of an elastic plastic material. Elastic plastic materials can be manufactured in a cost-effective way, have good sealing properties and are resistant to external influences. For the purpose of the assembly, a seal of this type can be easily pulled over the layer structure and the LEDs. This is particularly advantageous for a one-part seal enclosing the entire edge of the layer structure.

In another preferred embodiment the LED panel light comprises a lid resting against the seal, the seal and the layer structure being arranged between the lid and the housing frame. The lid serves to clamp the layer structure relative to the housing frame, thereby creating the sealing effect with respect to the layer structure and the housing frame. The lid may be formed of one part or of several parts.

Preferably, the lid rests against the seal on the side of the reflector plate, in a region surrounding the entire edge, so that a cavity is defined between the reflector plate and the lid which is sealed as well. It is possible to arrange additional component parts required for the operation of the light in this cavity, e.g. drivers or transformers.

In a particularly preferred embodiment the lid is clamped relative to the housing frame by means of screws, thus rendering the assembly particularly easy.

BRIEF DESCRIPTION OF THE DRAWINGS

Advantageous embodiments of the present invention will be explained in more detail below by means of drawings. In the drawings.

DETAILED DESCRIPTION

In the following description like parts will be designated with like reference numbers. If a drawing includes reference numbers which are not referred to in more detail in the associated description of the figure, reference will be made to the preceding or subsequent description of the figure.

Figure 1:
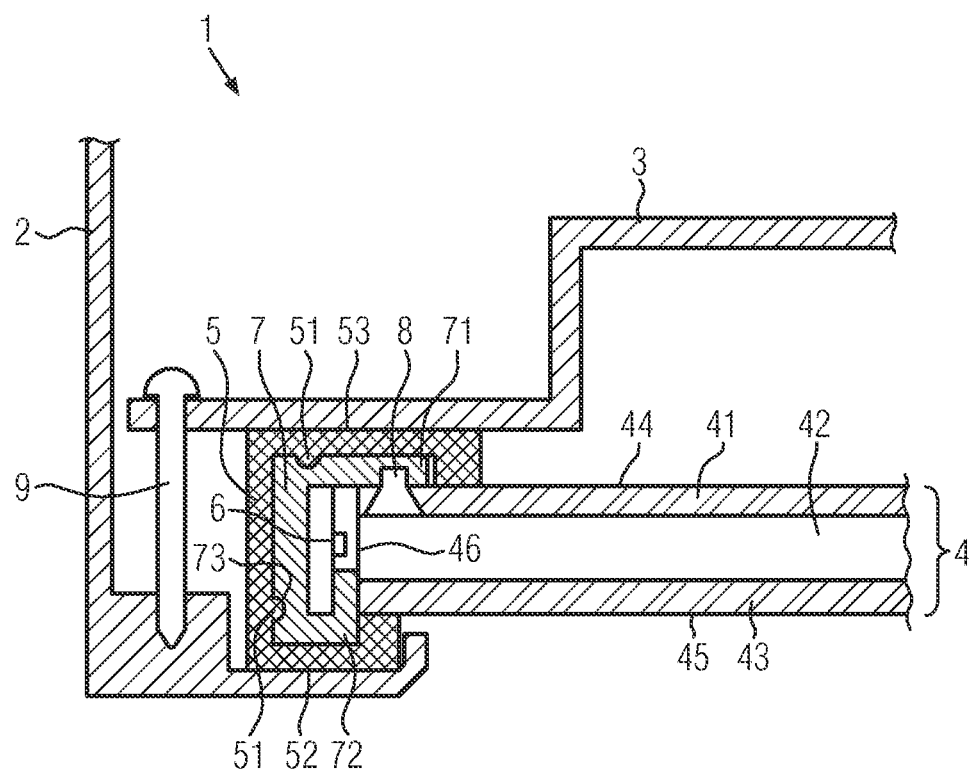
FIG. 1 shows a schematic cross-sectional view of an LED panel light according to the invention.

The LED panel light 1 illustrated in FIG. 1 comprises a housing frame 2, a lid 3 and an interposed optical layer structure 4. The edge 46 of the layer structure and LEDs 6, in the form of an LED strip and arranged at the edge 46, are enclosed by a seal 5. The LED strip 6 is mounted on a profile strip 7. The layer structure 4 includes a continuous reflector plate 41, a light guiding layer 42 and a cover glass 43. The light guiding layer 42 is arranged between the reflector plate 41 and the cover glass 43. An angled leg 71 of the profile strip 7 is screwed to the reflector plate 41 by means of screws 8. The profile strip 7 further has a second leg 72 such that a U-shaped region is defined, in which the LED strip 6 is inserted.

The seal 5 is U-shaped and encompasses the edge 46 of the layer structure 4. It contacts the top side 44 of the reflector plate 41 and the bottom side 45 of the cover glass 43. The profile strip 7 has two grooves 73 extending in the longitudinal direction with which the seal 5 engages by means of two protrusions 51. The seal 5 rests with its bottom side 52 against the housing frame 2 and with the top side 53 against the lid 3. The lid 3 is clamped relative to the housing frame 2 by means of screws 9 so that the seal 5 seals the layer structure 4 against the housing frame 2 and the seal 5 is pressed against the top side 44 of the reflector plate 41 and the bottom side 45 of the cover glass 43. A region is available between the top side 44 of the reflector plate 41 and the lid 3 in which additional non-illustrated component parts of the light are arranged, e.g. drivers or transformers. These could be fixed, for instance, to the bottom side of the lid 6 or to the top side 44 of the reflector plate 41.

The light of the LEDs 6 is radiated, at the side, into the edge 46 of the light guiding layer 42. The light guiding layer 42 is a light emitting prism plate made of. The light is therefore distributed over the total layer and guided across the total surface upwardly and downwardly. The reflector plate 41 is configured as a reflector sheet and reflects the light portion guided upwardly back in the direction of the cover glass 43. The cover glass 43 is made of glass and is opal. It diffusely scatters the light entering from the light guiding layer 42 and mixes it, so that light is emitted across the total surface of the cover glass 43 as uniformly as possible. In the embodiment shown the cover glass 43 has a plane bottom side 45.

The LED panel light 1 is fixed with the housing frame 2 to a wall, ceiling or the like. According to the invention the seal 5 has a one-piece configuration and encompasses the entire edge 46 of the layer structure 4. Moreover, the housing frame 2 surrounds the layer structure 4 and the lid 3, both having a one-piece configuration. The whole bottom side 52 of the seal 5 is in contact with the housing frame 2. The whole top side 53 of the seal is in contact with the lid 3 so that the region for receiving additional components between the layer structure 4 and the lid 3 is sealed as well.

Figure 2:
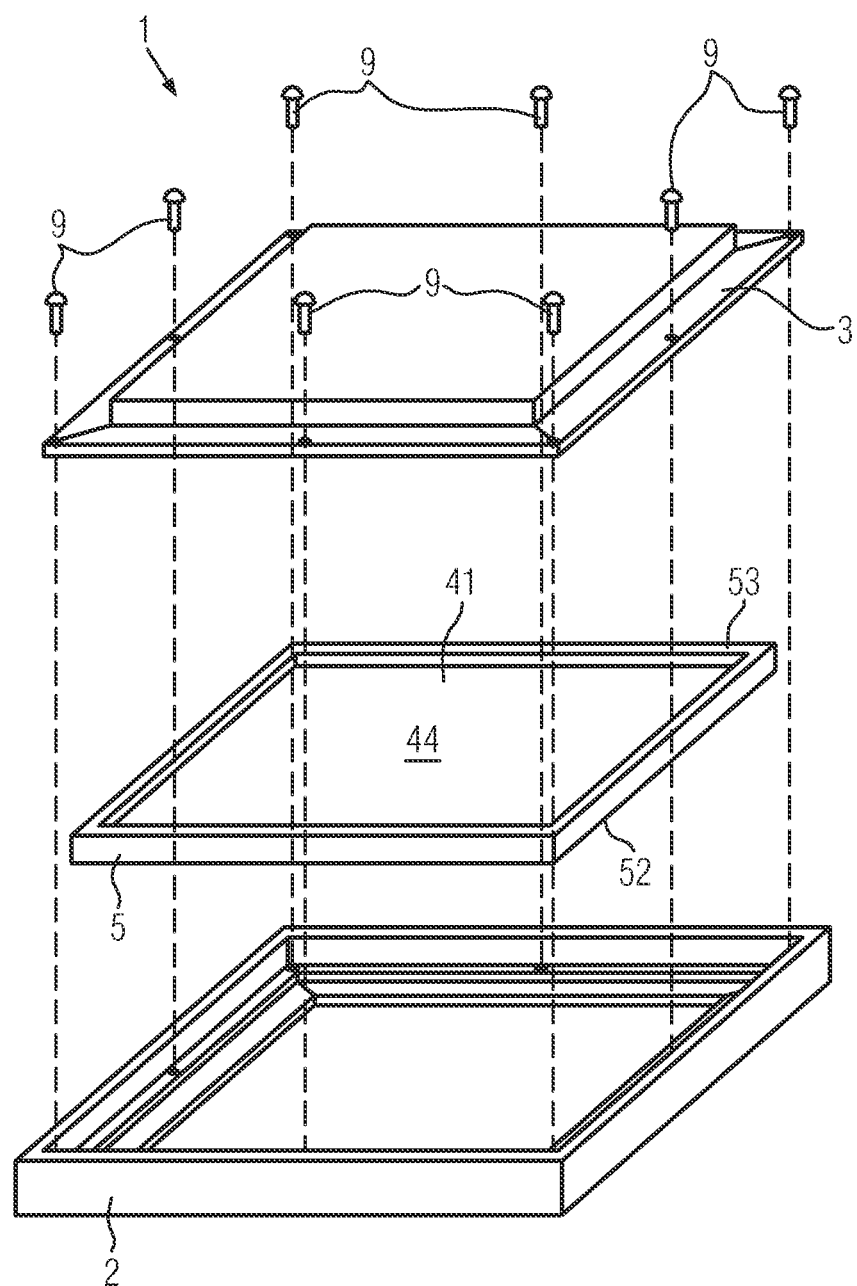
FIG. 2 shows a perspective schematic exploded view of an LED panel light according to the invention.

For assembling the described and illustrated light 1, initially the LED strip 6 is screwed to the profile strip. In the second step, the profile strip 7 is screwed to the reflector plate 41 or secured to same using retaining clips. Then, reflector plate 41, light guiding layer 42 and cover glass 43 are arranged loosely on top of one another, and the seal 5 is pulled over the edge 46 of the layer structure 4 and the profile strip 7. As shown in FIG. 2, the seal 5, together with the profile strip 7 and the layer structure 4, is now inserted into the housing frame 2. As soon as possibly existing additional components have been fixed to the top side 44 of the reflector plate 41 or in the lid 3, the lid 3 is placed onto the top side 53 of the seal 5 and clamped relative to the housing frame 2 by means of screws 9.

The invention claimed is:

1. A LED panel light, comprising:
an optical layer structure, the layer structure including a top side, a bottom side and an edge and comprising at least two substantially plate-shaped layers arranged loosely on top of one another, wherein the layers are in particular not glued to one another or connected to one another using an alternative form of material bond, and wherein the layer structure comprises a reflector plate, a light layer and a cover glass forming layers of the layer structure,
one or more LEDs as light source, the LEDs being arranged at the edge of the layer structure and radiating light into the layer structure at the side,
an elastic seal enclosing the LEDs and the edge of the layer structure, the elastic seal being in contact with a side of the reflector plate of the layer structure and a side of the cover glass of the layer structure, and
a housing frame, the elastic seal resting against or on the housing frame so that the elastic seal seals the layer structure against the housing frame, the housing frame and the layer structure being clamped relative to one another such that the elastic seal is pressed against the top side and the bottom side of the layer structure.

2. The LED panel light according to claim 1, wherein the LED panel light comprises a profile strip which is arranged at the edge of the layer structure and on which the LEDs are arranged.

3. The LED panel light according to claim 2, wherein the profile strip is permanently connected to at least one layer of the layer structure.

4. The LED panel light according to claim 3, wherein the profile strip is screwed to at least one layer of the layer structure.

5. The LED panel light according to claim 4, wherein the profile strip is screwed to the reflector plate.

6. The LED panel light according to claim 2, wherein an angled leg is formed on the profile strip.

7. The LED panel light according to claim 2, wherein at least one first interlocking member is formed on the profile strip, at least one second interlocking member is formed on the elastic seal, and the first interlocking member interacts with the second interlocking member.

8. The LED panel light according to claim 2, wherein the profile strip includes two grooves, and wherein the elastic seal includes two protrusions to engage the two grooves of the profile strip.

9. The LED panel light according to claim 2, wherein the profile strip is L-shaped or U-shaped.

10. The LED panel light according to claim 1, wherein the elastic seal is configured as an one-piece, circumferential seal which encloses the entire edge of the layer structure.

11. The LED panel light according to claim 1, wherein the cross-section of the elastic seal is substantially U-shaped.

12. The LED panel light according to claim 1, wherein the elastic seal is made of an elastic plastic material.

13. The LED panel light according to claim 1, wherein the LED panel light comprises a lid resting against the elastic seal, the elastic seal and the layer structure being arranged between the lid and the housing frame.

14. The LED panel light according to claim 13, wherein the lid is clamped relative to the housing frame by means of screws.

15. The LED panel light according to claim 13, wherein the lid is clamped to the housing frame by means of screws such that a bottom side of the elastic seal directly rests against the housing frame and a top side of the elastic seal contacts the lid.

16. The LED panel light according to claim 13, wherein the lid is clamped to the housing frame by means of screws such that elastic seal directly presses against a top side of the reflector plate and directly presses against a bottom side of the cover glass.

17. The LED panel light according to claim 1, wherein the elastic seal contacts a top side of the reflector plate.

18. The LED panel light according to claim 1, wherein the elastic seal contacts a bottom side of the cover glass.

* * * * *